(12) United States Patent
French et al.

(10) Patent No.: US 8,140,683 B2
(45) Date of Patent: Mar. 20, 2012

(54) METHOD AND SYSTEM FOR SELECTING AN OPERATING SYSTEM AT USER LOGIN ON A TARGET DEVICE

(75) Inventors: Steven M. French, Austin, TX (US); Lorin E. Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 4275 days.

(21) Appl. No.: 09/731,631

(22) Filed: Dec. 7, 2000

(65) Prior Publication Data

US 2002/0073201 A1    Jun. 13, 2002

(51) Int. Cl.
*G06F 15/16* (2006.01)

(52) U.S. Cl. ........ 709/227; 709/220; 717/175; 711/147; 713/1; 713/182

(58) Field of Classification Search .................. 709/220, 709/224, 227; 713/1, 182; 717/175; 711/147
See application file for complete search history.

(56) References Cited

U.S. PATENT DOCUMENTS

| 5,353,411 | A | 10/1994 | Nakaosa et al. |
|---|---|---|---|
| 5,367,686 | A | 11/1994 | Fisher et al. |
| 5,454,110 | A | 9/1995 | Kannan et al. |
| 5,519,870 | A | 5/1996 | Kannan et al. |
| 5,613,125 | A | 3/1997 | Nguyen et al. |
| 5,668,992 | A | 9/1997 | Hammer et al. |
| 6,066,182 | A | 5/2000 | Wilde et al. |
| 6,182,275 | B1 * | 1/2001 | Beelitz et al. ................. 717/175 |
| 6,189,100 | B1 * | 2/2001 | Barr et al. ..................... 713/182 |
| 6,457,122 | B1 * | 9/2002 | Ramezani ......................... 713/1 |
| 6,477,624 | B1 * | 11/2002 | Kedem et al. ................. 711/147 |

OTHER PUBLICATIONS

A handbook entitled, "Preboot Execution Environment (PXE) Specification", Version 2-1, [Published by Intel Corporation with special contributions from SystemSoft, dated Sep. 20, 1999, pp. 1-101].

* cited by examiner

*Primary Examiner* — Tammy Nguyen

(74) *Attorney, Agent, or Firm* — Yee & Associates, P.C.; Jeffrey S. LaBaw

(57) ABSTRACT

A method of selecting an operating system at a target device in communication with a server is provided. A network bootstrap program is initiated at the target device prior to executing an operating system at the target device. The target device sends a bootstrap list command from the target device to the server and receives an operating systems list of at least one operating system. A target operating system is then selected from the operating systems list.

20 Claims, 6 Drawing Sheets

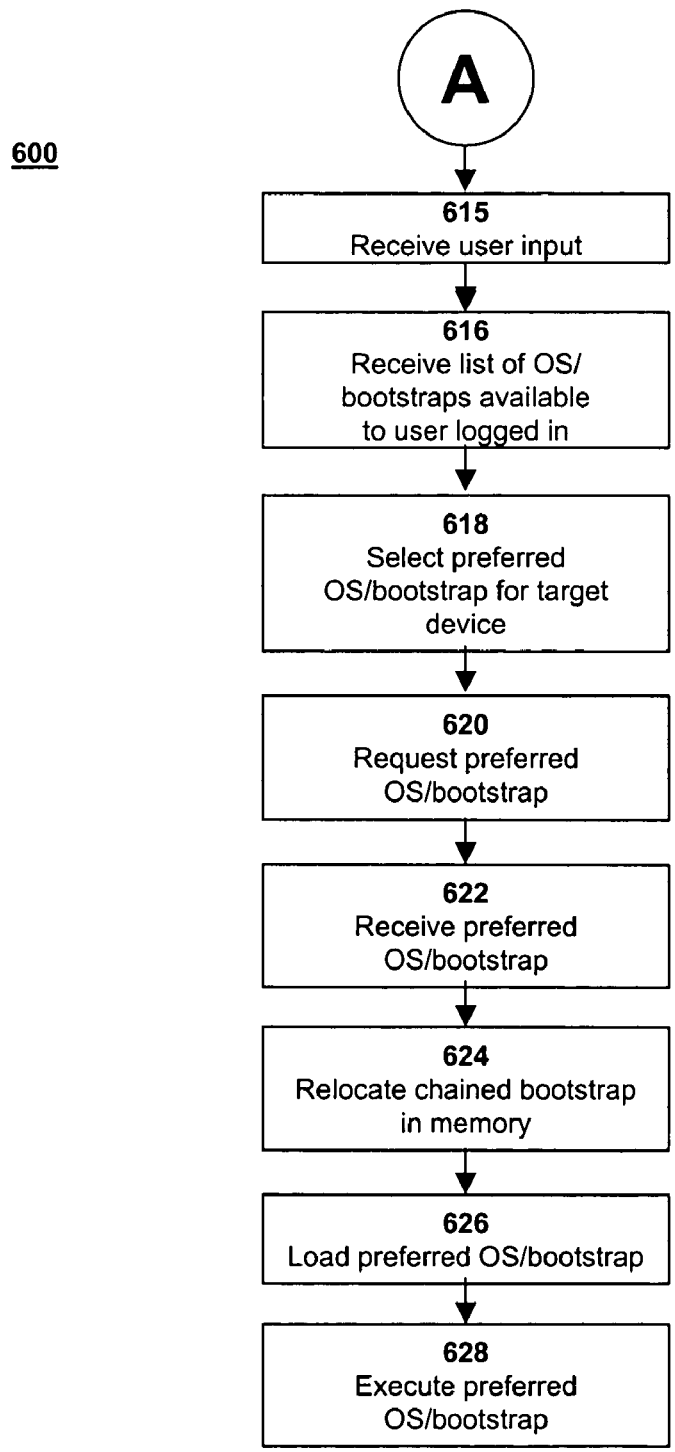

METHOD AND SYSTEM FOR SELECTING AN OPERATING SYSTEM AT USER LOGIN ON A TARGET DEVICE

BACKGROUND OF THE INVENTION

1. Field of the Invention

The present invention relates to client computers that are bootable over a network and, in particular, client computers that may be serviced by multiple boot servers. More specifically, the present invention relates to a method for selecting an operating system on a target device that is remotely booted.

2. Description of the Related Art

Some current computing devices include support for preboot extensions to download an operating system (OS) from a network to which they are attached. Such target computing devices include computer motherboards, network adapters and boot diskettes. These devices rely on extensions to the bootstrap protocol (BOOTP) and to the dynamic host configuration protocol (DHCP). Such extensions are often termed the preboot execution environment (PXE) and require a DHCP/PXE server and a boot image negotiation layer (BINL) server.

BOOTP is a transmission control protocol/Internet protocol (TCP/IP) used by a diskless workstation, network computer (NC) or other target device to obtain its IP address and other network information, such as server address and default gateway. Upon startup, the target device sends out a BOOTP request to the BOOTP server, which returns the required information. The BOOTP request and response use an IP broadcast function, which is able to send messages before a specific IP address for a target device is known.

DHCP is software that automatically assigns an IP address to a target device logging onto a TCP/IP network. DHCP eliminates the need for manually assigning permanent IP addresses.

PXE enables a client network computer or other target device that lacks a native operating system to locate and acquire a small network bootstrap program (NBP) from a BINL server. The target device may acquire this NBP from a BINL server through a network attachment. PXE also provides a means for running the NPB on the target device. This allows the target device to continue acquiring additional software from the network that may be required to make the target device capable of performing the more complex and useful tasks assigned to it by an enterprise.

PXE relies on extensions of DHCP as the means by which the target device locates a BINL server from which to acquire an NPB. A facilitating property of DHCP is that the target device does not need the address of any other computer. The target device performs a DHCP broadcast to discover any PXE proxy server that can recognize that the target device is PXE-capable. The DHCP proxy server sends a DHCP offer to the target device. The offer contains the address of the BINL server from which the target device may obtain a NBP. The target device then obtains the NBP and all necessary software from the boot server via a trivial file transfer protocol (TFTP).

Current approaches to selecting the operating system to boot on a target device depend on the BINL server, which is delivered by multiple vendors, such as Intel™, IBM™ and Microsoft™. Each platform has different implementations and behaviors. Once the operating system is booted on a target device, a user can login and use the operating system currently available on the target device. However, if a user moves to a different target device on the network, he cannot have the OS he was using follow him to the new target device. There is also no way for the user to indicate which OS he would like to use on a given target device.

It would be desirable therefore to provide a method of selecting an operating system that overcomes the above.

SUMMARY OF THE INVENTION

One aspect of the present invention provides a method of selecting an operating system at a target device in communication with a server. A network bootstrap program is initiated at the target device and a bootstrap list command is sent from the target device to the server. An operating systems list is received prior to executing an operating system at the target device and a target operating system is selected from the operating systems list.

Instructions for the target operating system may be received. These instructions may be requested from the server. The target operating system may be booted based on these instructions. A default operating system may be included in the operating systems list. After the target operating system is selected, the network bootstrap program may be relocated. The target operating system may be determined from a configuration file of the target device or may be selected by a user of the target device. The operating systems list may include at least one operating system that is available to the user and/or at least one operating system that is available to the target device.

Another aspect of the present invention provides computer program product in a computer usable medium for selecting an operating system at a target device prior to executing an operating system at the target device. The program may include means for initiating network bootstrap program code at the target device, means for receiving a command requesting an operating systems list of at least one operating system, means for sending the operating systems list to the target device and means for receiving a selection of a target operating system from the operating systems list.

The program may also include means for sending the target operating system to the target device. The program may also include means for determining a default operating system. The program may include means for relocating the network bootstrap program code after the target operating system is selected. The program may also include means for determining the target operating system from a configuration file of the target device. The program may include means for receiving selection of the target operating system from a user. The program may also include means for determining operating systems that are available to the user or that are available to the device.

Another aspect of the present invention provides a network data processing system. The system may include means for initiating a network bootstrap program at a target device, means for sending a command requesting an operating systems list of at least one operating system, means for receiving the operating systems list prior to executing an operating system at the target device and means for selecting a target operating system from the operating systems list at the target device.

The system may also include means for receiving the target operating system at the target device. The system may also include means for executing the target operating system at the target device. The system may also include means for relocating the network bootstrap program after the target operating system is selected. The system may also include means for determining the target operating system from a configuration file of the target device or from input of a user of the target device.

The foregoing, and other, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims in equivalence thereof.

BRIEF DESCRIPTION OF THE DRAWINGS

FIG. 6 is a flow diagram of another embodiment of a method of selecting an operating system continuing the embodiment of FIG. 4.

DETAILED DESCRIPTION

Figure 1:
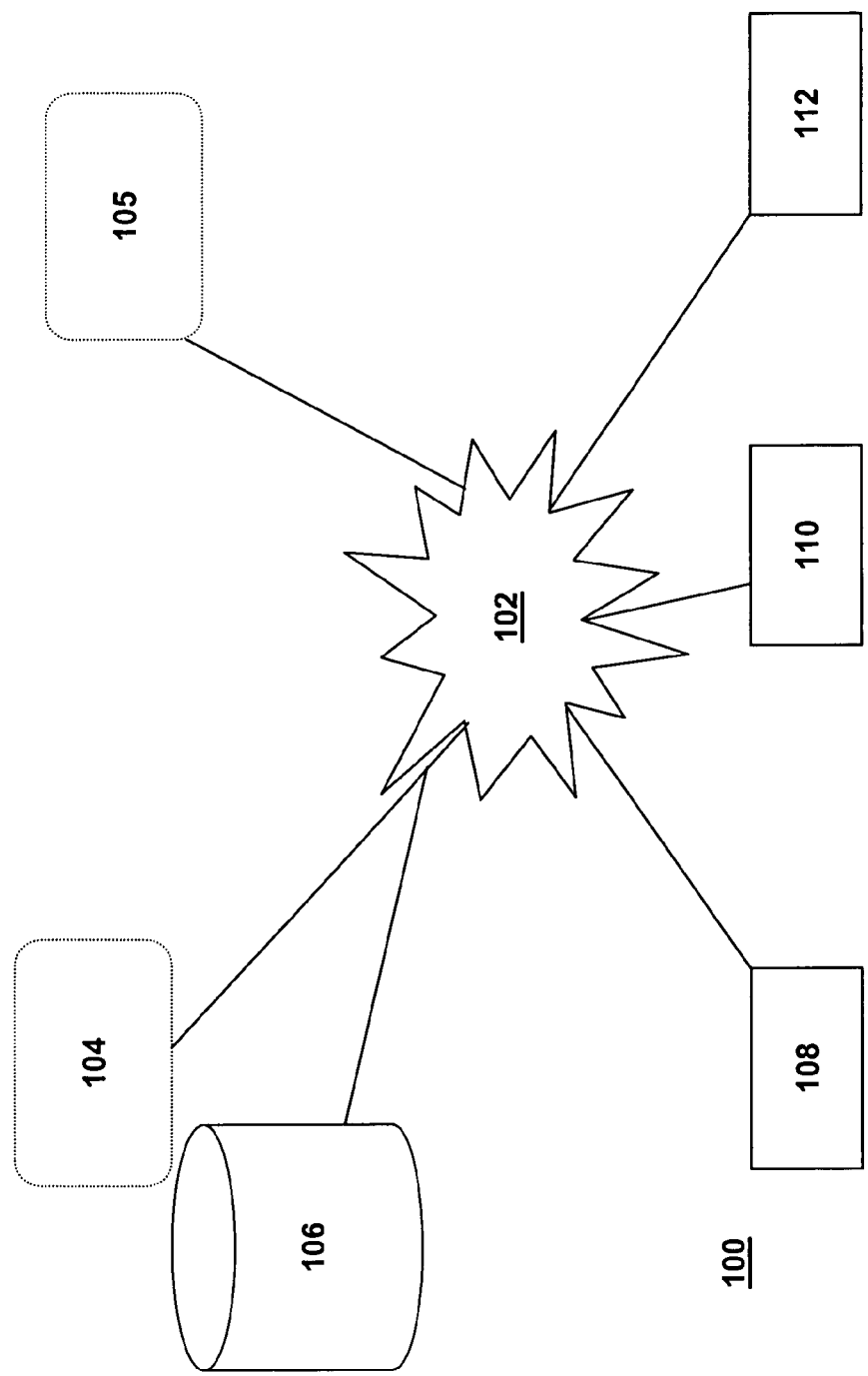
FIG. 1 is a schematic diagram of one embodiment of a network of data processing systems in accordance with the present invention.

FIG. 1 is a schematic representation of a network of data processing systems in accordance with the present invention at 100. Network data processing system 100 may be a network of computers in which the present invention may be implemented. Network data processing system 100 may contain a network. Network 102 may be any suitable medium used to provide communications links between various devices, such as computers, connected to or in communication with each other within network data processing system 100. For example, network 102 may include connections, such as wire connections, wireless communication links or fiber optic cables.

In the embodiment of FIG. 1, a server 104 may be in communication with network 102. Server 104 may provide data, such as boot files, operating system images and applications to network 102 and/or to other components in communication with network 102 as described below. System 100 may also include another server 105 which may be identical to or different from server 104. Server 105 may also provide data, such as boot files, operating system images and applications to network 102 and/or to other components in communication with network 102 as described below. System 100 may also include additional servers (not shown).

One or more storage units, such as storage unit 106 may also be in communication with server 104, 105 and/or network 102. Storage unit 106 may store data, such as boot files, operating system images and applications that may be processed or conveyed by server 104. Storage unit 106 may also store data to be made available to or processed by network 102 and/or to other components in communication with network 102 as described below.

In addition, target devices 108, 110 and 112 are also in communication with network 102. These target devices may be, for example, personal computers or network computers. Target devices 108, 110, 112 may serve as clients to server 104. Network data processing system 100 may include additional servers, clients and other devices not shown.

As seen in FIG. 1, network data processing system 100 may be any suitable system of processing data. For example system 100 may be the Internet. Alternatively, network data processing system 100 may also be any suitable type of network such as, for example, an intranet, a local area network (LAN) or a wide area network (WAN). In one embodiment of the invention, network 102 represents a worldwide collection of networks and gateways that use the TCP/IP suite of protocols to communicate with one another. A backbone of high-speed data communication lines between major nodes or host computers allows communication between thousands of commercial, government, educational and other computer systems that route data and messages.

One embodiment of the present invention provides a network environment, which may include a DHCP/PXE proxy server. For example, server 104 may be a DHCP/PXE proxy server. Alternatively, server 105 may be a DHCP/PXE proxy server. System 100 may also include one or more boot servers. For example server 104 or server 105 may serve as a boot server. These boot servers may be collated on servers 104, 105 with the DHCP/PXE proxy servers. In one embodiment of the invention, one or more target devices, such as devices 108, 110, 112, may include pre-boot extensions that allow the devices to download OS information from a boot server.

Figure 2:
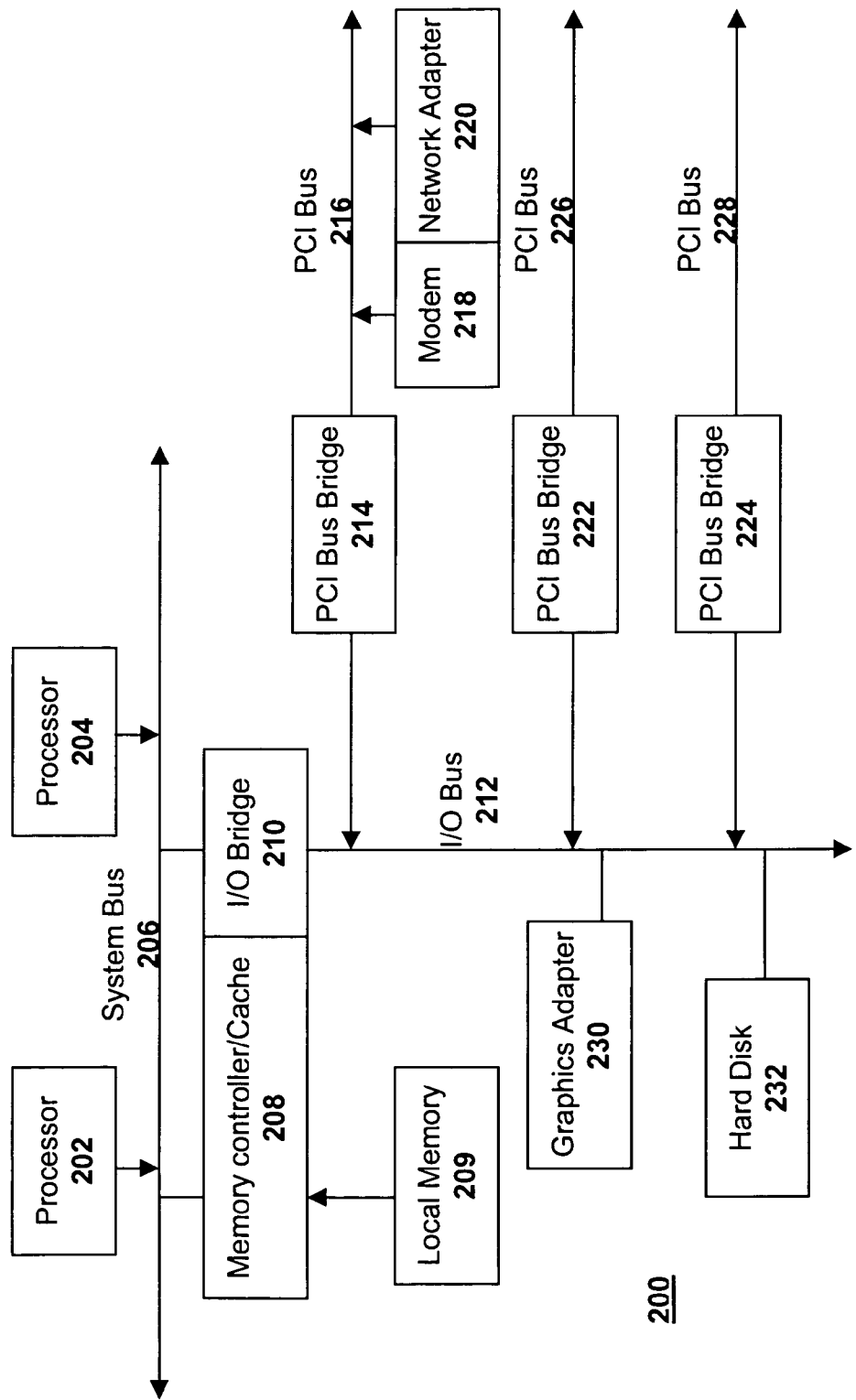
FIG. 2 is a block diagram of one embodiment of a data processing system in accordance with the present invention.

FIG. 2 is a block diagram of a data processing system in accordance with the present invention at 200. In one embodiment of the invention, data processing system 200 may be implemented as one or more of the servers 104, 105 shown in FIG. 1.

Data processing system 200 may be a symmetric multiprocessors (SMP) system including a plurality of processors 202 and 204 connected to system bus 206. Alternatively, a single processor system may be employed. Memory controller/cache 208 may also be connected to system bus 206. Memory controller/cache 208 may provide an interface to local memory 209. I/O bus bridge 210 may also be connected to system bus 206 and may provide an interface to I/O bus 212. Memory controller/cache 208 and I/O bus bridge 210 may be integrated as depicted or may be separate components.

Peripheral component interconnect (PCI) bus bridge 214 connected to I/O bus 212 may provide an interface to PCI local bus 216. One or more modems may be connected to PCI bus 216. Typical PCI bus implementations will support four PCI expansion slots or add-in connectors. Modem 218 and network 220 may be connected to PCI local bus 216. This connection may be through add-in boards. In one embodiment of the invention, modem 218 and accompanying connections provide communications links to target devices such as network computers. For example, such target devices may be those described above at FIG. 1.

Additional PCI bus bridges 222 and 224 may provide interfaces for additional PCI buses 226 and 228. Additional modems or network adapters may be supported from PCI buses 226 and 228. In this manner, data processing system 200 may allow connections to multiple network computers. A memory-mapped graphics adapter 230 and hard disk 232 may also be connected to I/O bus 212 as depicted, either directly or indirectly.

The components depicted in FIG. 2 may be arranged as shown or in any suitable manner that allows data processing system 200 to function as desired. Additionally, other peripheral devices, such as optical disk drives and the like, may be used in addition to or in place of the components depicted.

One embodiment of data processing system 200 may be an IBM RISC/System 6000 system, a product of International Business Machines Corporation in Armonk, N.Y., running the Advanced Interactive Executive, or AIX™, operating system.

Figure 3:
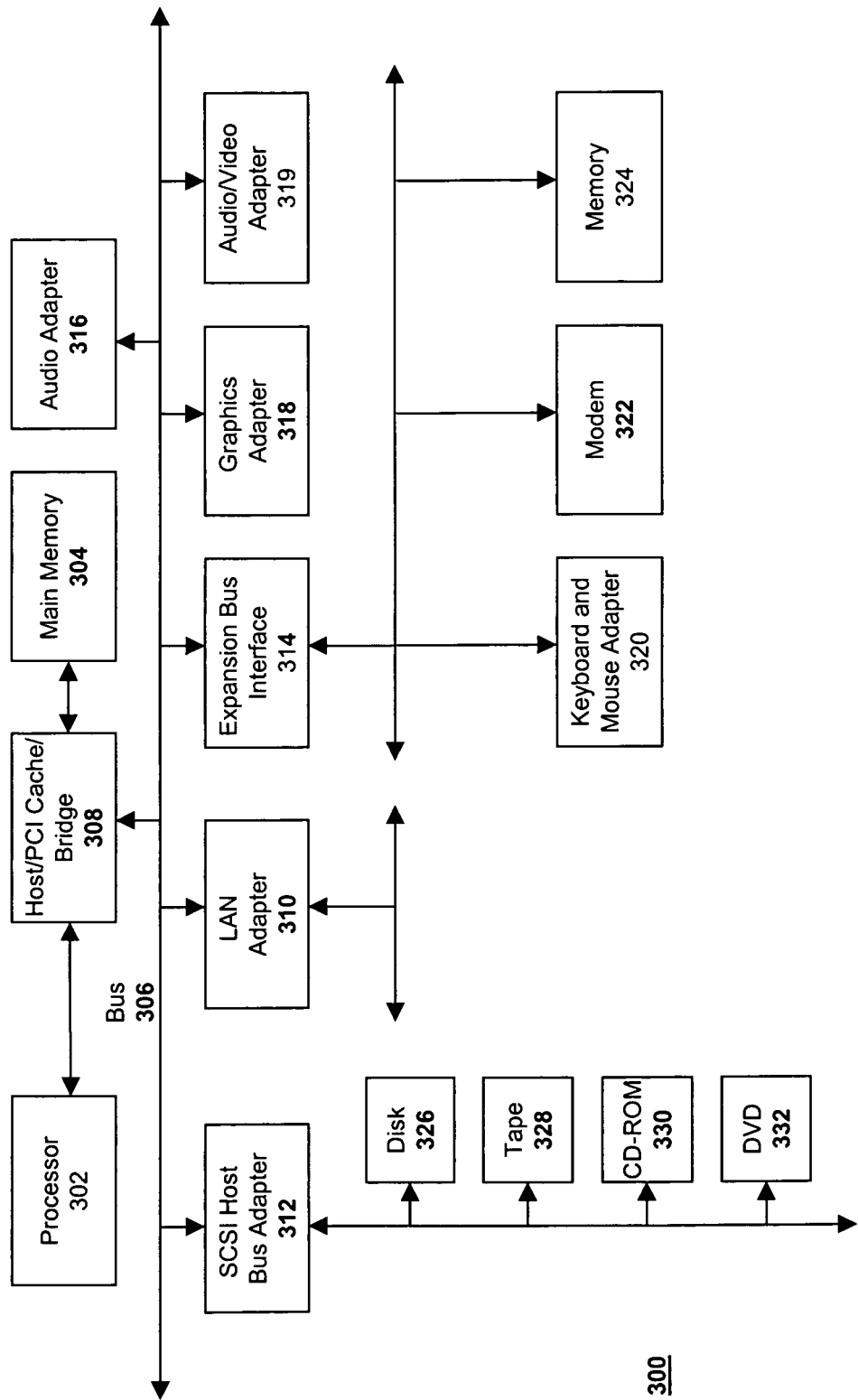
FIG. 3 is a block diagram of another embodiment of a data processing system in accordance with the present invention.

FIG. 3 is a block diagram of a data processing system in accordance with the present invention at 300. Data processing system 300 may be, for example, one or more of the target devices 108, 110, 112 depicted in FIG. 1 and described above. In one embodiment of the invention, data processing system 300 may be a stand-alone system configured to be bootable without relying on a network communication interface. Alternatively, data processing system 300 may also comprise one or more network communication interfaces. Data processing system 300 may also be a personal digital assistant (PDA) device. Data processing system may also take the form of a notebook computer or handheld computer. Alternatively, data processing system 300 may be a kiosk or Web appliance. The processes of the present invention may also be applied to a multiprocessor data processing system.

Data processing system 300 may employ a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 may be connected to PCI local bus 306 via PCI bridge 308. PCI bridge 308 may also include an integrated memory controller and cache memory for processor 302. Additional connections to PCI local bus 306 may be made through direct component interconnection or through add-in boards. In one embodiment of the invention, local area network (LAN) adapter 310, SCSI host bus adapter 312, and expansion bus interface 314 are connected to PCI local bus 306 by direct component connection. In contrast, audio adapter 316, graphics adapter 318 and audio/video adapter 319 are connected to PCI local bus 306 by add-in boards inserted into expansion slots. Expansion bus interface 314 may provide a connection for additional components such as, for example, a keyboard and mouse adapter 320, a modem 322 and additional memory 324. A small computer system interface (SCSI) host bus adapter 312 may provide a connection for additional components such as, for example, a hard disk drive 326, a tape drive 328, a CD-ROM drive 330 or a DVD 332. PCI local bus 306 may be any suitable local bus implementation. Typical PCI local bus implementations support three or four PCI expansion slots or add-in connectors.

In one embodiment of the invention, an operating system (OS) may run on processor 302. This OS may be used to coordinate and provide control of various components within data processing system 300. The OS may be a commercially available operating system, such as, for example, Linux™, OS/2 Warp 4, or Windows 2000™. An object oriented programming system may be in communication with the OS and may run in conjunction with the OS. For example, the object-oriented programming system may provide calls to the OS from programs or applications executing on data processing system 300. These programs or applications may be specific to the object-oriented programming system or may be programs or applications run by other programming systems. In one embodiment of the invention, the object-oriented programming system may be Java™, a trademark of Sun Microsystems, Inc.

Instructions for the OS, the object-oriented operating system, and applications or programs may be located on storage devices such as, for example, hard disk drive 326. These operating systems, applications and/or programs may be loaded into main memory 304 for execution by processor 302.

The components of system 300 depicted in FIG. 3 may be arranged as shown or in any suitable manner that allows data processing system 300 to function as desired. Other internal hardware or peripheral devices, such as flash ROM (or equivalent nonvolatile memory) or optical disk drives and the like, may be used in addition to or in place of the components depicted. For example, one embodiment of data processing system 300 may be configured with ROM and/or flash ROM in order to provide non-volatile memory for storing operating system files and/or user-generated data.

Figure 4:
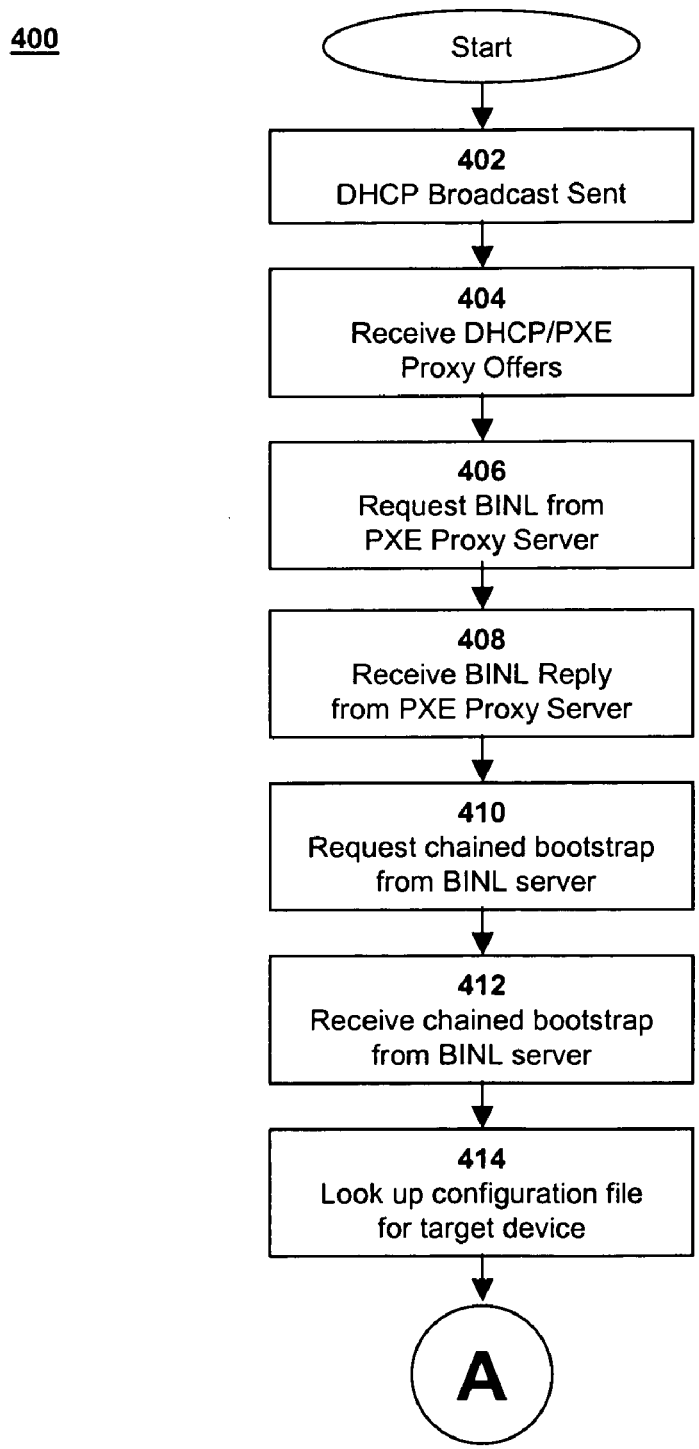
FIG. 4 is a flow diagram of one embodiment of a method of selecting an operating system in accordance with the present invention.

FIG. 4 is one embodiment of a method for selecting an operating system in accordance with the present invention at 400. The operating system selected using this method may be an OS on a target device such as devices 108, 110, 112 depicted in FIG. 1 and described above. A user of a target device may login to the device before or after the process shown at 400 is completed.

At block 402, the target device may send a DHCP broadcast. For example, the target device may be connected to a network and send the DHCP broadcast to the network and servers, such as BINL servers, in communication with the network.

At block 404, the target device may receive DHCP/PXE proxy offers. These proxy offers indicate which other components in communication with the target device are able to process a BINL request.

At block 406, the target device may send a BINL request to a PXE proxy server. In one embodiment of the invention, this PXE proxy server is one of the proxy offers received at block 404.

At block 408, the target device may receive a BINL reply from the PXE proxy service. In one embodiment of the invention, this reply indicates the IP address of a BINL server.

At block 410, the target device may send a TFTP request to the BINL server indicated at block 408. In one embodiment of the invention, the request is for an initial NPB file. At block 412, the reply may be received from the BINL server. For example, the server may provide an initial NBP file to the target device.

In one embodiment of the invention, the NBP file is a chained bootstrap. This chained bootstrap may be specified once as the default bootstrap. This chained bootstrap may be the first bootstrap loaded on the target device. This chained bootstrap "chains" itself, e.g., interposes itself in front of, the actual OS/bootstrap to be used on the target machine. In one embodiment of the invention, a reference to this chained bootstrap is the only entry in the BINL server. Alternatively, a reference to this chained bootstrap may be the default reply of the BINL server. Thus, the BINL configuration may not change regardless of the OS/bootstrap eventually used on a given target device. The BINL configuration also may not change when a new OS is added into the system.

At block 414, a configuration file may be located for the target device. The configuration file may be any suitable file that provides useful data regarding the target device, including information on how the target device is currently configured or information about how target device should be configured. The configuration file may be located in any suitable location in system 200, 300. In one embodiment of the invention, the configuration file is located on server 104, 105. The configuration file may indicate which OS and associated bootstrap should be downloaded to boot the target device. In one embodiment of the invention, the configuration file may be written into a directory specific to the target device. The directory may be contained on the target device or on the server. The configuration file may contain location information for and name of the target OS/bootstrap. In one embodiment of the invention, the configuration file is managed by a separate system, making it independent of the implementation of BINL servers from different vendors.

Figure 5:
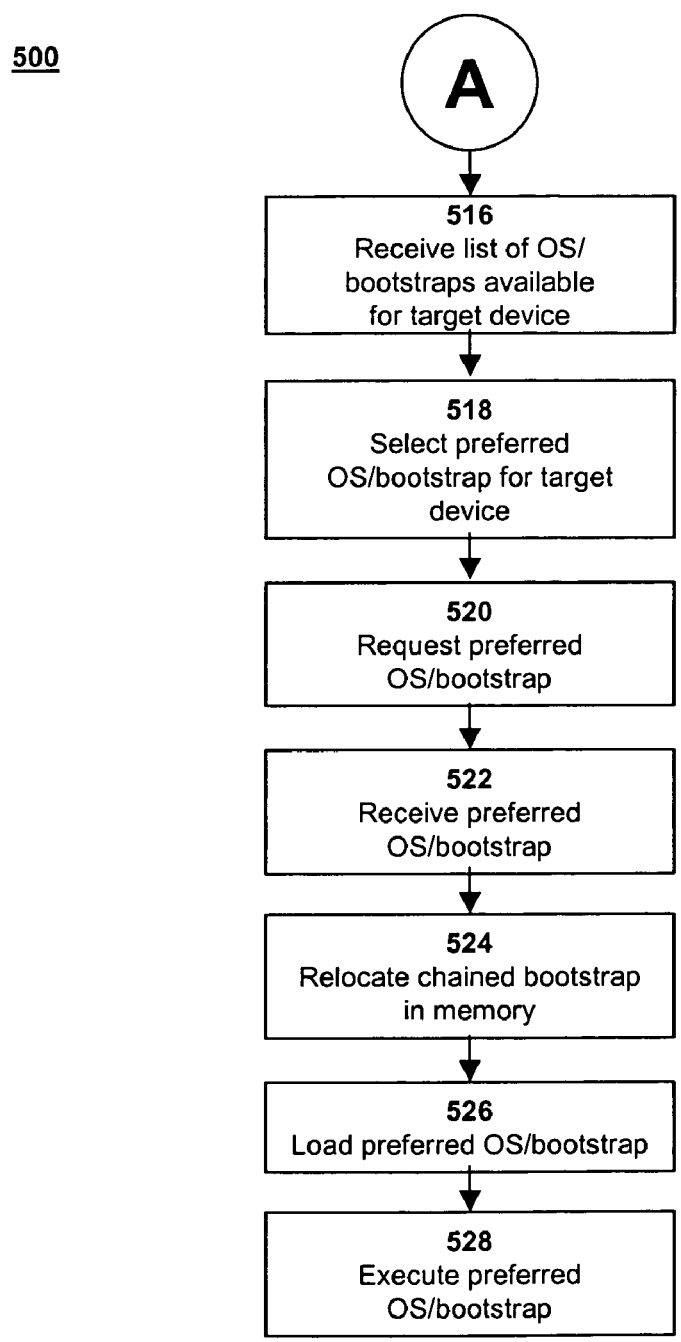
FIG. 5 is a flow diagram of one embodiment of a method of selecting an operating system continuing the embodiment of FIG. 4.

FIG. 5 is another embodiment of a method for selecting an operating system in accordance with the present invention at 500. The operating system selected using this method may be an OS on a target device such as devices 108, 110, 112 depicted in FIG. 1 and described above. The process shown at 500 may be used once the process of FIG. 4 has been used, for example, to retrieve a chained bootstrap. A user of a target device may login to the device before or after the process shown at 500 is completed.

At block 516, once the configuration file of the target device has been accessed (at block 414), a list of OS/bootstraps available for the target device may be received. The OS choices may be specified, for example, by a boot manager on a BINL server 104, 105. In one embodiment of the invention, the target device's configuration file may provide information about the OS/bootstraps that may be used with the target device.

At block 518, the preferred bootstrap for the target device may be selected. This selection may be automatic. Alternatively, a system administrator or other such entity may select the preferred bootstrap. Alternatively, the user may be provided with the list of available OS/bootstraps and may then select the preferred bootstrap. For example, the user may select a preferred bootstrap from a graphic user interface that shows the list of available OS/bootstraps.

At block 520, the preferred OS/bootstrap may be requested. In one embodiment of the invention, this request takes the form of a TFTP request to the BINL server.

At block 522, the preferred OS/bootstrap may be received. For example, the OS and its associated bootstrap may be downloaded to the target device.

At block 524, the chained bootstrap may then relocate itself so that it does not interfere with the preferred OS/bootstrap. In one embodiment, the chained bootstrap relocates itself in the memory of the target device.

At block 526, the preferred OS/bootstrap may be loaded on the target device.

At block 528, the preferred OS/bootstrap may be executed on the target device.

FIG. 6 is another embodiment of a method for selecting an operating system in accordance with the present invention at 600. The operating system selected using this method may be an OS on a target device such as devices 108, 110, 112 depicted in FIG. 1 and described above. The process shown at 600 may be used once the process of FIG. 4 has been used, for example, to retrieve a chained bootstrap. A user of a target device may login to the device before the process shown at 600 is completed.

For example, at block 615, the user may login to the target device. This login may provide user input that may be used to determine which OS/bootstraps may be made available to the target device based on the user input. In one embodiment of the invention, a user profile is accessed. This profile may be stored in any suitable component of a data processing system 200 or network 300 as described above. In one embodiment, this profile includes the OS systems that the user is authorized or able to use. The OS choices may be specified, for example, by a boot manager on a BINL server 104, 105 based on the user. Alternatively, operating systems that are not available to the logged in user may be disabled and therefore not incorporated into the list of OS/bootstraps available for the target device. For example, the profile for user "AJONES" may only allow user Jones use of Windows 2000™ as an operating system even if the target device's configuration file accessed at 414 indicates that Linux™ and OS/2 Warp 4™ are also available to the target device.

At block 616, a list of OS/bootstraps available for the user may be received. This list may be a list based on a combination of a configuration file for the target device and a user profile for the user as described above. In the above example, the list of OS/bootstraps received would include only Windows 2000™.

At block 618, the preferred bootstrap for the target device may be selected. This selection may be automatic. Alternatively, a system administrator or other such entity may select the preferred bootstrap. Alternatively, the user may be provided with the list of available OS/bootstraps and may then select the preferred bootstrap. For example, the user may select a preferred bootstrap from a graphic user interface that shows the list of available OS/bootstraps.

At block 620, the preferred OS/bootstrap may be requested. In one embodiment of the invention, this request takes the form of a TFTP request to the BINL server. At block 622, the preferred OS/bootstrap may be received. For example, the OS and its associated bootstrap may be downloaded to the target device. At block 624, the chained bootstrap may then relocate itself so that it does not interfere with the preferred OS/bootstrap. In one embodiment, the chained bootstrap relocates itself in the memory of the target device. At block 626, the preferred OS/bootstrap may be loaded and executed (block 628) on the target device.

While the present invention has been described in the context of a fully functioning data processing system, it will be appreciated that the processes described may be distributed in any other suitable context. For example, the processes described may take the form of a computer readable medium of instructions. The present invention applies equally regardless of the type of signal-bearing media actually used to carry out the distribution. Examples of computer readable media include recordable-type media, such as a floppy disk, a hard disk drive, a RAM, CD-ROMs, DVD-ROMS, and transmission-type media, such as digital and analog communications links, wired or wireless communications links using transmission forms such as, for example, radio frequency and light wave transmissions. The computer readable media may take the form of coded formats that are decoded for actual use in a particular data processing system.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

The invention claimed is:

1. A method of selecting an operating system at a target device in communication with a server, comprising: initiating a network bootstrap program at the target device; sending a bootstrap list command from the target device to the server, receiving an operating systems list of at least one operating system prior to executing an operating system at the target device; selecting a target operating system from the operating systems list, wherein the target device is to be remotely booted by the server; and relocating the network bootstrap program after the target operating system is selected.

2. The method of claim 1 further comprising: receiving instructions for the target operating system.

3. The method of claim 1 further comprising: requesting the instruction for the target operating system from the server.

4. The method of claim 1 further comprising: booting the target operating system based on the instructions.

5. The method of claim 1 wherein the operating systems list includes a default operating system.

6. The method of claim 1 wherein the target operating system is determined from a configuration file of the target device.

7. The method of claim 1 wherein the target operating system is selected by a user of the target device.

8. The method of claim 7 further comprising: determining from a user profile, at least one available operating system; and including the user-available operating system with the operating systems list.

9. The method of claim 1 further comprising: determining from a target device profile, at least one device-available operating system; and including the device available operating system with the operating systems list.

10. Computer program product in a non-transitory computer usable medium for selecting an operating system at a target device, comprising: means for initiating network bootstrap program code at the target device; means for receiving a command requesting an operating systems list of at least one operating system; means for sending the operating systems list to the target device before an operating system~s executed at the target device; and means for receiving a selection of a target operating system from the operating systems list, wherein the target device is to be remotely booted by the server; and means for relocating the network bootstrap program code after the target operating system is selected.

11. The program of claim 10 further comprising: means for sending the target operating system to the target device.

12. The program of claim 10 further comprising: means for determining a default operating system.

13. The program of claim 10 further comprising: means for determining the target operating system from a configuration file of the target device.

14. The program of claim 10 further comprising: means for receiving the selection of the target operating system from a user of the target device.

15. The program of claim 14 further comprising: means for determining at least one operating system available to the user.

16. A network data processing system comprising: means for initiating a network bootstrap program at a target device, the target device to be remotely booted by the server; means for sending a command requesting an operating systems list of at least one operating system; means for receiving the operating systems list prior to executing an operating system at the target device; and means for selecting a target operating system from the operating systems list at the target device; and means for relocating the network bootstrap program after the target operating system is selected.

17. The system of claim 16 further comprising: means for receiving the target operating system at the target device.

18. The system of claim 16 further comprising: means for executing the target operating system at the target device.

19. The system of claim 16 further comprising- means for determining the target operating system from a configuration file of the target device.

20. The system of claim 16 further comprising: means for determining the target operating system from input of a user of the target device.

* * * * *